United States Patent
Nantz et al.

(10) Patent No.: US 6,434,470 B1
(45) Date of Patent: Aug. 13, 2002

(54) TIRE PRESSURE VEHICLE SPEED LIMITING

(75) Inventors: John S. Nantz, Brighton; Riad Ghabra, Dearborn Heights; Qingfeng Tang, Novi; Salman Khreizat, Dearborn, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/730,958

(22) Filed: Dec. 5, 2000

(51) Int. Cl.$^7$ .............................................. B60K 31/00
(52) U.S. Cl. ........................................... 701/93; 701/99
(58) Field of Search ..................... 701/93, 99; 180/197; 477/108, 104, 120, 125; 340/444, 442, 443

(56) References Cited

U.S. PATENT DOCUMENTS

| | | | |
|---|---|---|---|
| 3,916,688 A | 11/1975 | Dendy et al. ............ 731/1.78 T |
| 4,101,870 A | 7/1978 | Ekman ........................ 340/459 |
| 4,450,431 A | 5/1984 | Hochstein ................... 340/447 |
| 4,670,845 A | 6/1987 | Etoh ........................... 701/301 |
| 4,909,074 A | 3/1990 | Gerresheim ................. 73/146.4 |
| 4,951,208 A | 8/1990 | Etoh ............................. 701/97 |
| 5,156,230 A | 10/1992 | Washburn .................... 180/170 |
| 5,165,497 A | 11/1992 | Chi ............................. 180/169 |
| 5,479,171 A | 12/1995 | Schuermann ............ 340/10.41 |
| 5,485,381 A | 1/1996 | Heintz et al. ................. 701/93 |
| 5,546,308 A | * 8/1996 | Yamamoto .................... 701/93 |
| 5,557,552 A | * 9/1996 | Naito et al. ................. 702/148 |
| 5,573,611 A | 11/1996 | Koch et al. ............... 152/152.1 |
| 5,661,651 A | * 8/1997 | Geschke et al. .............. 701/88 |
| 5,665,026 A | * 9/1997 | Linden ........................ 477/108 |
| 5,705,746 A | 1/1998 | Trost et al. ................... 73/146 |
| 5,740,548 A | 4/1998 | Hudgens ....................... 701/35 |
| 5,774,047 A | 6/1998 | Hensel, IV. ................. 340/442 |
| 5,793,285 A | * 8/1998 | Wehinger .................... 340/443 |
| 5,976,056 A | * 11/1999 | Matsumoto et al. ........ 477/125 |
| 5,982,279 A | * 11/1999 | Tominaga et al. .......... 340/444 |
| 6,092,028 A | * 7/2000 | Naito et al. ................... 702/47 |

* cited by examiner

Primary Examiner—William A. Cuchlinski, Jr.
Assistant Examiner—Marthe Y. Marc-Coleman
(74) Attorney, Agent, or Firm—Brooks & Kushman P.C.

(57) ABSTRACT

Tire over- or under-inflation can create problems in vehicle operation. To limit the effects of out-of-range tire pressure, vehicle speed is automatically controlled if the vehicle speed is not appropriate for measured tire air pressure.

19 Claims, 2 Drawing Sheets

TIRE PRESSURE VEHICLE SPEED LIMITING

TECHNICAL FIELD

The present invention relates to measuring vehicle tire air pressure and utilizing these measurements.

BACKGROUND ART

The air pressure within inflated vehicle tires is an important parameter for vehicle operation. Vehicle dynamics are closely linked to tire performance. These dynamics affect many aspects of vehicle operation, including handling, braking, rollover characteristics, and the like. Tire pressure also affects the life of the tire. Excess tire pressure may make the tire more susceptible to puncture and, if extreme, to burst damage. Tire under-pressure may result in the generation of excess heat, particularly at elevated vehicle speeds. To ensure proper tire performance, vehicle tires are typically given a range of inflation pressures based on the tire type, vehicle type, vehicle configuration and use, expected driving conditions, and the like. Despite its importance, tire inflation pressure may at times fall outside of specified ranges. Tires often lose air pressure gradually, making the point at which inflation pressure drops below the specified value difficult to detect. Many air pressure gauges for use with vehicle tires are inaccurate, resulting in under-inflation or over-inflation even when proper care is taken. Further, modern run-flat tires provide limited performance even in the presence of substantial pressure loss, making such loss difficult for the vehicle operator to detect.

In-vehicle tire pressure monitoring systems are currently available. Typically, these systems include a tire pressure sensor built into the tire or attached to the tire valve stem. Each sensor relays measured tire pressure to an associated receiver via a wireless link. Tire pressure information is then provided to the vehicle operator by an indicator or graphic display on the vehicle dashboard. Such a display, however, may not solve the problem of out-of-range tire pressure if the display is either unnoticed, misinterpreted, or ignored by the vehicle operator. What is needed is to automatically reduce the effects of out-of-range vehicle tire pressure.

DISCLOSURE OF INVENTION

The present invention automatically controls vehicle speed if the vehicle speed is not appropriate for measured tire air pressure.

A system for limiting vehicle speed is provided. The system includes at least one tire pressure sensor. Each tire pressure sensor generates a pressure signal based on the pressure of air within a tire. The system also includes a vehicle speed sensor generating a signal based on the vehicle speed. Control logic generates at least one signal to control the vehicle power plant automatically reducing vehicle speed if that speed is not appropriate for at least one tire based on the sensed tire air pressure.

In an embodiment of the present invention, the system further includes an indicator controlled by the control logic. The indicator indicates automatic speed reduction to the vehicle operator.

In another embodiment of the present invention, each tire pressure sensor generates a signal based on self diagnosis. The control logic inhibits automatic vehicle speed reduction based on sensed tire air pressure in a tire with a pressure sensor generating a failed self diagnosis signal.

In various additional embodiments of the present invention, the control logic automatically reduces vehicle speed if the tire pressure is less than a minimum value, if the tire pressure is less than a value based on the vehicle speed, if the tire pressure is greater than a maximum value, and/or if the tire pressure is greater than a value based on the vehicle speed.

A method of limiting vehicle speed is also provided. Air pressure is sensed in at least one tire. The vehicle speed is sensed. A check is made to determine if vehicle speed is appropriate for each tire based on the sensed tire pressure. If vehicle speed is not appropriate for each tire, the vehicle speed is automatically controlled.

In various embodiments of the present invention, the vehicle speed may be reduced by controlling the delivery of fuel to an engine powering the vehicle, controlling the delivery of spark to an engine powering the vehicle, controlling the delivery of air to an engine powering the vehicle, controlling the revolution rate of a rotating power plant powering the vehicle, and controlling the delivery of electrical power to a motor powering the vehicle.

These and other objects, features and advantages of the invention are readily apparent from the following detailed description of the best mode for carrying out the invention when taken in conjunction with the accompanying drawings.

BEST MODE FOR CARRYING OUT THE INVENTION

Figure 1:
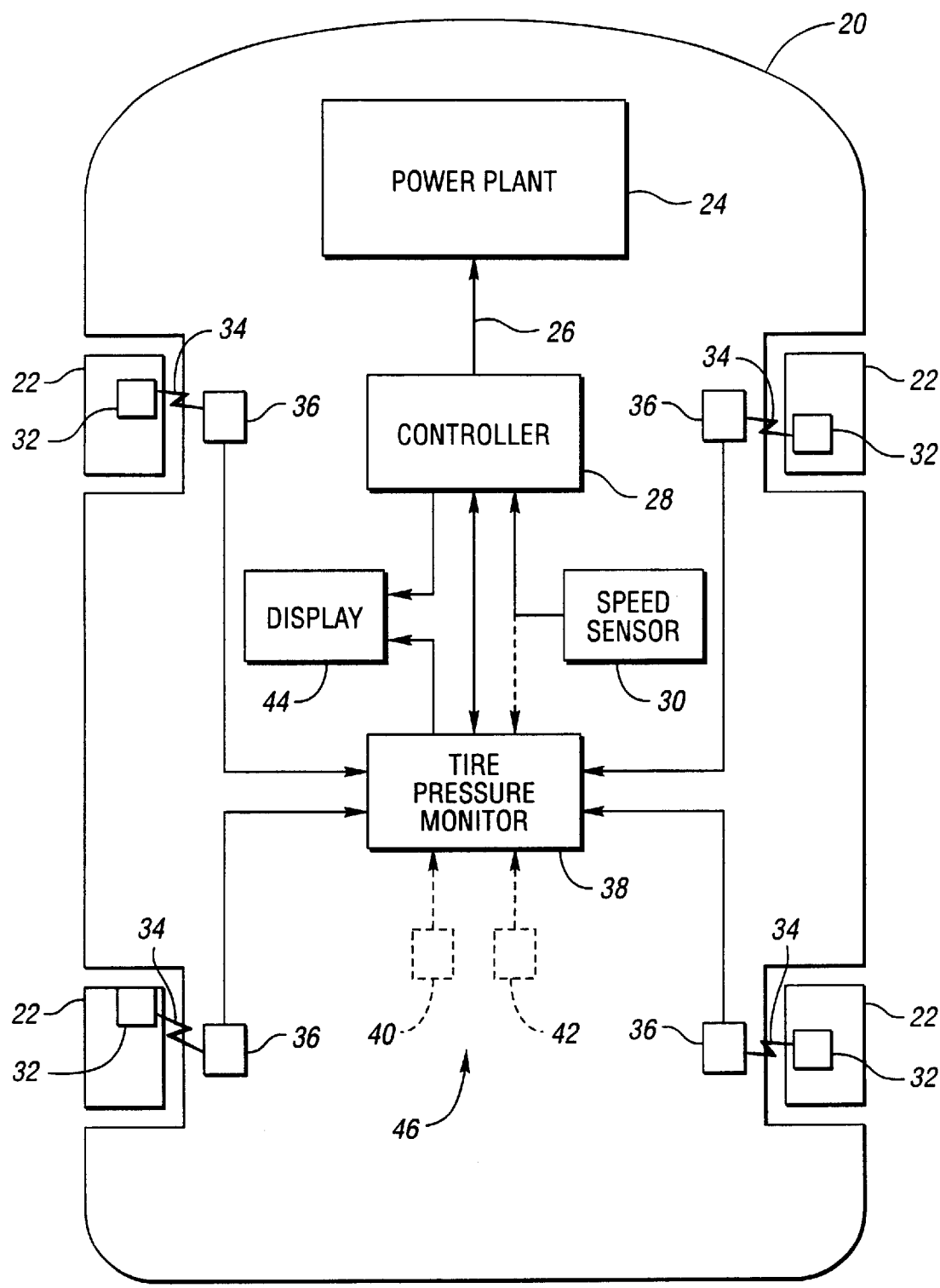
FIG. 1 is a block diagram of a system for limiting vehicle speed based on tire pressure according to an embodiment of the present invention.

Referring to FIG. 1, a block diagram of a system for limiting vehicle speed based on tire pressure according to an embodiment of the present invention is shown. Wheeled vehicle 20 has one or more tires 22, at least one of which is typically driven by power plant 24 to propel vehicle 20 at a particular vehicle speed. Any form of power plant 24 may be used, including gasoline engines, turbines, diesel engines, electric motors, and the like. Power plant 24 receives power plant control signals 26 from power plant controller 28. Power plant controller 28 controls the operation of power plant 24 by receiving inputs from a variety of sensors such as speed sensor 30 measuring the speed of vehicle 20. Power plant control signals 26 modify the operation of power plant 24 through a variety of means depending, in part, on the type of power plant 24. These include controlling the delivery of fuel, spark, and air to an engine powering vehicle 20; controlling the revolution rate of a rotating power plant 24 powering vehicle 20; and controlling the delivery of electrical power to a motor powering vehicle 20. Thus, power plant 24, controller 28, and speed sensor 30 form a closed loop system that may be used to control the speed of vehicle 20.

At least one tire 22, and preferably each tire 22, are monitored for tire inflation pressure by tire pressure sensors 32. Typically, tire pressure sensor 32 is located within tire 22 or is attached to an inflation valve for tire 22. Tire pressure sensor 32 measures the air pressure within tire 22. Tire pressure sensor 32 or an associated sensor may also measure one or more additional parameters associated with tire 22, such as tire temperature, tire usage, tire life, and the like. A preferred tire pressure sensor 32 is the model SP13 from SensoNor asa of Norton, Norway.

Information is transmitted from tire pressure sensor 32 through wireless link 34 to one or more receivers 36. Wireless link 34 is preferably a radio link, but may be established through any wireless means including ultrasonic, subsonic, magnetic coupling, and the like. Each tire 22 may have an associated receiver 36 or receiver 36 may be located in a central position within vehicle 20. Receiver 36 forwards tire pressure information to, or is incorporated into, tire pressure monitor 38.

Tire pressure monitor 38 may perform a variety of functions. Tire pressure monitor 38 calculates the pressure in each tire 22 based on signals from receivers 36. Tire pressure monitor 38 may calculate the pressure in each tire 22 based on information from other sensors, such as ambient pressure sensor 40, ambient temperature sensor 42, and the like. Tire pressure monitor 38 may also display information about the pressure in each tire 22 on display 44 viewable by an operator of vehicle 20.

Together, power plant controller 28 and tire pressure monitor 38 comprise control logic generating power plant control signals 26 to automatically control the speed of vehicle 20 if the vehicle speed is not appropriate for at least one tire 22 based on the sensed tire air pressure. Vehicle speed control may include reducing vehicle speed and preventing vehicle speed from exceeding a limiting speed. The limiting speed may be a preset value or may be calculated based on vehicle operating conditions. As will be recognized by one of ordinary skill in the art, controller 28 and tire pressure monitor 38 may be incorporated into the same device or may be divided between two or more devices. Control logic 46 may also be distributed to one or more receivers 36 and intelligent tire sensors 32. Preferably, control logic 46 is implemented as one or more microcontrollers. Some or all of control logic 46 may also be implemented using discrete components, programmable logic devices, gate arrays, custom integrated circuit chips, and the like.

Preferably, control logic 46 provides notification to an operator of vehicle 20 when speed is limited or reduced. This notification may be accomplished through an indicator lamp or illuminated graphic, through an image and/or text displayed on a screen, through an audio warning, through a heads-up display, or the like. Any such notification is represented generally by display 44.

Control logic 46 may also suspend automatic speed reduction based on the pressure in a tire 22 sent by tire pressure sensor 32 with a fault or other detected problem. Tire pressure sensor 32 may perform self diagnostic tests such as transducer failure, low battery, circuitry failure, and the like. Tire pressure sensor 32 may generate a signal indicating a failed self diagnostic test. Control logic 46 may then warn the vehicle operator through display 44 and ignore any subsequent out-of-range signal from tire pressure sensor 32 until a passing self diagnosis signal is received from tire pressure sensor 32 or until control logic 46 is reset, such as after replacing tire pressure sensor 32.

Figure 2:
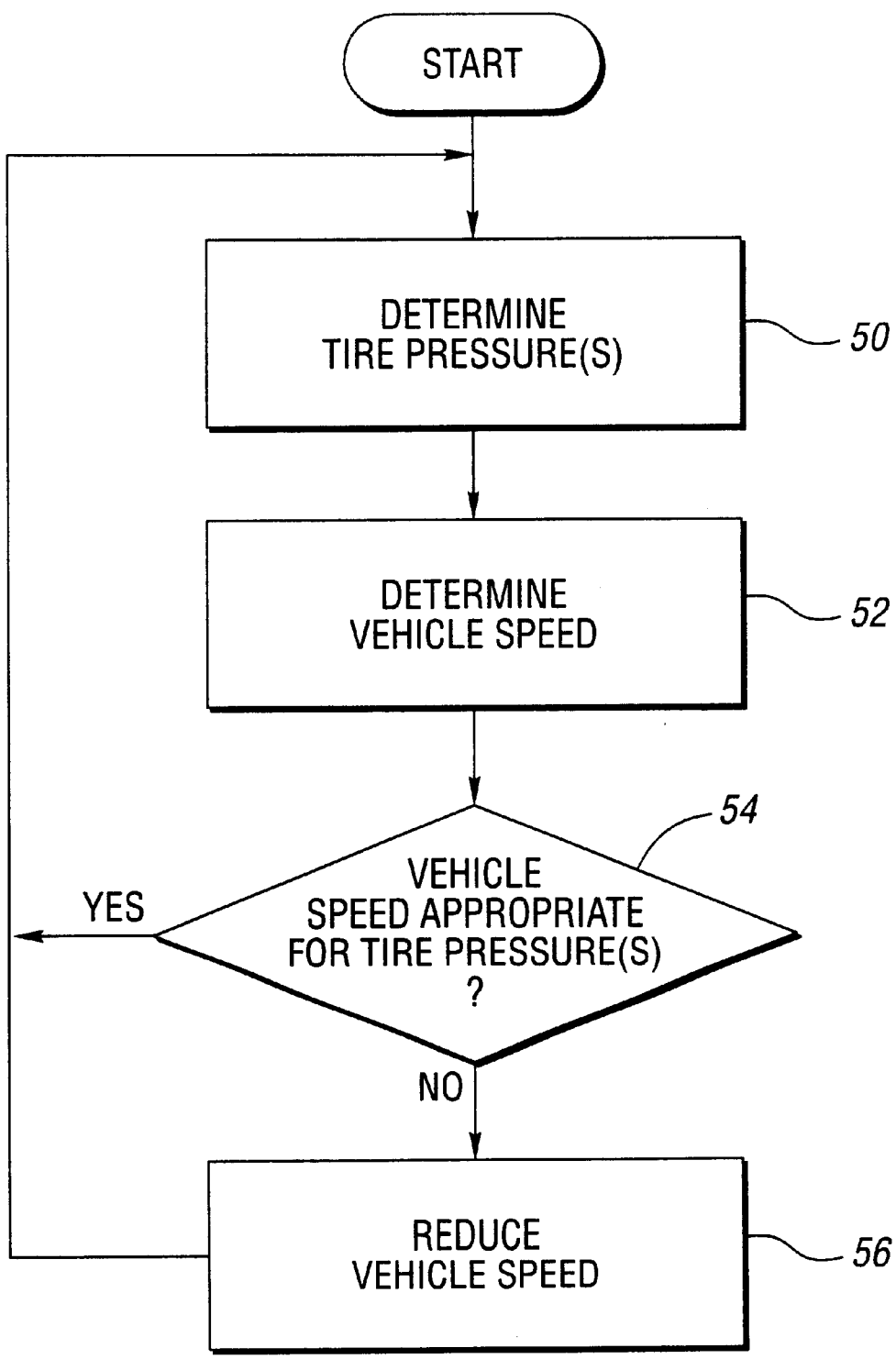
FIG. 2 is a flow diagram of a method for limiting vehicle speed based on tire pressure according to an embodiment of the present invention.

Referring now to FIG. 2, a flow diagram of a method for limiting vehicle speed based on tire pressure according to an embodiment of the present invention is shown. As will be appreciated by one of ordinary skill in the art, the operations illustrated in the flow diagram are not necessarily sequential operations. The order of steps may be modified within the spirit and scope of the present invention. Also, the method illustrated in FIG. 2 may be implemented by any combination of hardware, software, firmware, and the like. The present invention transcends any particular implementation and the embodiment is shown in sequential flow chart form for ease of illustration.

Tire pressures are determined in block 50. Tire pressures are based on measurements taken by tire pressure sensors 32. These measurements may be corrected for sensor characteristics, such as non-linearity and drift, and may be compensated for sensor cross-sensitivities such as temperature. Additional factors, such as ambient temperature, ambient pressure, tire loading, and the like, may be taken into account to improve measurement accuracy. Tire pressure calculation may take place in one or more of tire pressure sensor 32, receiver 36, tire pressure monitor 38, or controller 28.

Vehicle speed is determined in block 52. Speed sensor 30 measures the speed of vehicle 20. A wide variety of devices, methods, and locations for measuring the speed of vehicle 20 are known in the art. The actual vehicle speed or a value representing vehicle speed may be calculated from information supplied by speed sensor 30 in either or both of controller 28 and tire pressure monitor 38. The speed of vehicle 20 is typically displayed on display 44.

A check is made to determine if vehicle speed is appropriate for tire pressures in block 54. One or more of several comparisons may be used to determine if the speed of vehicle 20 is appropriate. First, vehicle speed may not be appropriate if the pressure in one or more tires 22 is less than a minimum value. This minimum value may be a preset threshold or may be based on one or more operating conditions of vehicle 20 such as vehicle load and load distribution, four-wheel drive mode, towing mode, automatic suspension mode, traction control operation, automatic brake system control, tire location, air pressure in other tires, ambient air pressure, ambient temperature, and the like. Second, vehicle speed may not be appropriate if one or more tires 22 have a tire pressure less than a value based on the speed of vehicle 20. Third, vehicle speed may not be appropriate if one or more tires 22 have a tire pressure greater than a maximum value. As with the minimum value, the maximum value may be preset or may be based on one or more vehicle operating conditions. Fourth, vehicle speed may not be appropriate if one or more tires 22 have a tire pressure greater than a value based on the vehicle speed. If vehicle speed is appropriate for tire pressures, the process of determining tire pressures and vehicle speed is repeated.

If vehicle speed is not appropriate for one or more tire pressures, the vehicle speed is reduced in block 56. The speed of vehicle 20 may be reduced to a value that is preset or based on one or more vehicle operating conditions. The maximum allowable speed may also be a function of the pressure in one or more tires 22. Preferably, controller 28 reduces the speed of vehicle 20 gradually until the speed of vehicle 20 is appropriate for the pressure in tires 22. Controller 28 reduces the speed of vehicle 20 by generating power plant control signals 26 to control one or more parameters of power plant 24. Preferably, the vehicle operator is warned if vehicle speed is reduced due to measured tire pressure. The process of determining tire pressures and vehicle speed is then repeated.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of limiting vehicle speed comprising:
   sensing the air pressure in at least one tire;
   sensing vehicle speed;
   determining at least one threshold based on at least one parameter of vehicle operation;
   determining if the vehicle speed is appropriate for each tire based on the sensed tire air pressure and on each determined threshold; and
   automatically controlling vehicle speed if the vehicle speed is not appropriate for each tire.

2. A method of limiting vehicle speed as in claim 1 wherein reducing vehicle speed comprises controlling the delivery of fuel to an engine powering the vehicle.

3. A method of limiting vehicle speed as in claim 1 wherein reducing vehicle speed comprises controlling the delivery of spark to an engine powering the vehicle.

4. A method of limiting vehicle speed as in claim 1 wherein reducing vehicle speed comprises controlling the delivery of air to an engine powering the vehicle.

5. A method of limiting vehicle speed as in claim 1 wherein reducing vehicle speed comprises controlling the revolution rate of a rotating power plant powering the vehicle.

6. A method of limiting vehicle speed as in claim 1 wherein reducing vehicle speed comprises controlling the delivery of electrical power to a motor powering the vehicle.

7. A method of limiting vehicle speed as in claim 1 wherein the at least one threshold comprises a maximum pressure threshold, the vehicle speed being not appropriate for the tire if the tire pressure is greater than the maximum pressure threshold.

8. A method of limiting vehicle speed as in claim 1 wherein the at least one threshold comprises a minimum pressure threshold, the vehicle speed being not appropriate for the tire if the tire pressure is less than the minimum pressure threshold.

9. A method of limiting vehicle speed as in claim 1 wherein the at least one parameter of vehicle operation consists of at least one from a set including vehicle load, vehicle load distribution, four-wheel drive mode, towing mode, automatic suspension mode, traction control operation, automatic brake system control, tire location, air pressure in other tires, ambient air pressure, and ambient temperature.

10. A method of limiting vehicle speed as in claim 1 wherein the at least one parameter of vehicle operation comprises vehicle speed.

11. A method of limiting vehicle speed as in claim 1 further comprising indicating automatic speed reduction to a vehicle operator.

12. A system for limiting vehicle speed comprising:
    at least one tire pressure sensor generating a pressure signal based on the pressure of air within a tire;
    a vehicle speed sensor generating a signal based on vehicle speed;
    a power plant causing the vehicle to move at the vehicle speed based on power plant control signals; and
    control logic in communication with each tire pressure sensor, the vehicle speed sensor and the power plant, the control logic generating at least one power plant control signal to automatically control vehicle speed if the vehicle speed is not appropriate for at least one tire based on the sensed tire air pressure and on at least one vehicle operating condition.

13. A system for limiting vehicle speed as in claim 12 further comprising an indicator controlled by the control logic, the indicator indicating automatic speed reduction to a vehicle operator.

14. A system for limiting vehicle speed as in claim 12 wherein the control logic automatically reduces vehicle speed if the tire pressure is less than a minimum value based on the at least one vehicle operating condition.

15. A system for limiting vehicle speed as in claim 12 wherein the control logic automatically reduces vehicle speed if the tire pressure is greater than a minimum value based on the at least one vehicle operating condition.

16. A system for limiting vehicle speed as in claim 12 wherein each tire pressure sensor generates a signal based on self diagnosis, the control logic inhibiting automatic vehicle speed reduction based on sensed tire air pressure for a tire with a pressure sensor generating a failed self diagnosis signal.

17. A system for limiting vehicle speed as in claim 16 further comprising an indicator controlled by the control logic, the indicator indicating the tire pressure sensor failed diagnostic testing.

18. A system for limiting vehicle speed as in claim 12 wherein the at least one vehicle operating condition consists of at least one from a set including vehicle load, vehicle load distribution, four-wheel drive mode, towing mode, automatic suspension mode, traction control operation, automatic brake system control, tire location, air pressure in other tires, ambient air pressure, and ambient temperature.

19. A system for limiting vehicle speed as in claim 12 wherein the at least one vehicle operation condition comprises vehicle speed.

* * * * *

UNITED STATES PATENT AND TRADEMARK OFFICE
CERTIFICATE OF CORRECTION

PATENT NO. : 6,434,470 B1
DATED : August 13, 2002
INVENTOR(S) : John S. Nantz, Riad Ghabra, Qingfeng Tang and Salman Khreizat It is certified that error appears in the above-identified patent and that said Letters Patent is hereby corrected as shown below:

<u>Column 6,</u>
Line 29, delete "minimum" and insert -- maximum --.

Signed and Sealed this

Seventeenth Day of December, 2002

JAMES E. ROGAN
*Director of the United States Patent and Trademark Office*